(12) United States Patent
Wang et al.

(10) Patent No.: US 10,552,403 B2
(45) Date of Patent: Feb. 4, 2020

(54) USING CHECKSUMS TO REDUCE THE WRITE LATENCY OF LOGGING

(71) Applicant: VMware, Inc., Palo Alto, CA (US)

(72) Inventors: Wenguang Wang, Santa Clara, CA (US); Jorge Guerra Delgado, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 634 days.

(21) Appl. No.: 14/719,209

(22) Filed: May 21, 2015

(65) Prior Publication Data
US 2016/0342641 A1 Nov. 24, 2016

(51) Int. Cl.
G03F 7/00 (2006.01)
G06F 16/23 (2019.01)
G06F 16/28 (2019.01)
G06F 11/20 (2006.01)

(52) U.S. Cl.
CPC ........ G06F 16/235 (2019.01); G06F 16/2358 (2019.01); G06F 16/289 (2019.01); G06F 11/2094 (2013.01)

(58) Field of Classification Search
CPC .................................................. G06F 11/2094
USPC ......................................................... 707/802
See application file for complete search history.

(56) References Cited

U.S. PATENT DOCUMENTS

| | | | | |
|---|---|---|---|---|
| 7,085,937 B1 * | 8/2006 | Rezvani | ................... | G06F 21/31 709/229 |
| 8,271,751 B2 * | 9/2012 | Hinrichs, Jr. | ....... | G06F 11/1441 707/639 |
| 8,447,989 B2 * | 5/2013 | Barrus | ..................... | G06F 21/64 713/181 |
| 8,788,830 B2 * | 7/2014 | Piersol | .................. | H04L 9/3236 713/176 |
| 8,862,561 B1 * | 10/2014 | Nesbit | ............... | G06F 17/30348 707/698 |
| 9,080,894 B2 * | 7/2015 | Spanier | .................. | G01D 4/004 |
| 9,565,250 B2 * | 2/2017 | Calder | ................ | H04L 67/1095 |
| 2007/0220262 A1 * | 9/2007 | Suzuki | .................... | G06F 9/453 713/176 |
| 2007/0234302 A1 * | 10/2007 | Suzuki | ...................... | G06F 8/61 717/126 |
| 2009/0083504 A1 * | 3/2009 | Belluomini | ......... | G06F 11/1076 711/162 |
| 2010/0332949 A1 * | 12/2010 | d'Abreu | ............. | G06F 11/1076 714/766 |
| 2011/0078237 A1 * | 3/2011 | Nakamura | .............. | H04L 41/12 709/203 |

(Continued)

*Primary Examiner* — Eliyah S. Harper (57) ABSTRACT

Techniques for reducing write latency when logging write operations are provided. In one embodiment, a computer system can receive a write operation originating from a storage client, where the write operation is directed to a data object stored on a nonvolatile storage of the computer system. The computer system can further calculate a checksum value based on the contents of the data object as modified by the write operation, and generate a log record for the write operation that includes the first checksum value and a pointer to a location of the data object on the nonvolatile storage. The computer system can then issue the write operation and a write of the log record concurrently to the nonvolatile storage, thereby reducing the latency incurred for the overall write/logging process before a write acknowledgement is sent to the storage client.

15 Claims, 5 Drawing Sheets

(56) References Cited

U.S. PATENT DOCUMENTS

| | | | | |
|---|---|---|---|---|
| 2012/0095965 A1* | 4/2012 | Elron | ............... | G06F 17/30575 |
| | | | | 707/639 |
| 2013/0062420 A1* | 3/2013 | Hamman | ............. | H04L 9/0866 |
| | | | | 235/494 |
| 2015/0317176 A1* | 11/2015 | Hussain | ................. | G06F 3/067 |
| | | | | 718/1 |
| 2016/0132871 A1* | 5/2016 | Bobrovnikoff | ........ | G06Q 20/28 |
| | | | | 705/71 |

* cited by examiner

USING CHECKSUMS TO REDUCE THE WRITE LATENCY OF LOGGING

BACKGROUND

Logging (i.e., the act of recording events as "log records" in a data structure referred to as a "log") is a commonly used technique in computing environments. The log records that are collected in a log can be used for various purposes, such as ensuring data consistency in the face of system crashes/failures, executing asynchronous processes, and so on.

In some cases, the log records of a log may include pointers to data that is external to the log. For example, consider a log that is configured to keep track of on-disk data blocks created/updated in response to write I/O for the purpose of performing asynchronous storage deduplication. In this scenario, each log record can include a pointer to the on-disk location of a data block outside of the log, along with an indication that the data block has been created/updated due to a write operation. These log records can then be "replayed" at a later time in order to revisit the referenced data blocks and to merge together duplicate data, such that only a single instance of each unique data block is maintained on the storage tier.

In the above and other similar logging scenarios, when a write operation is received, existing logging implementations will typically wait for the write operation to finish before committing a corresponding log record to disk that points to the written data block. This ensures that the log record is valid (i.e., correctly indicates that the write operation has been successfully completed). If the log record is written before write completion can be confirmed, there may be situations where a system crash occurs between the writing of the log record and the completion of the write operation. This, in turn, will cause the log record to indicate that the write operation was successfully executed on the referenced data block, when in fact the system crash prevented that operation from completing.

While the foregoing approach of writing the data block first and the log record second ensures validity of the log record, it also suffers from certain drawbacks. For example, since the originator of the write operation must wait for two writes (i.e., the write operation itself and the writing of the log record) to finish in sequence before receiving an acknowledgement, the perceived I/O latency for the write operation is effectively doubled. This can be problematic in environments where low latency write performance is critical.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

I. Overview

The present disclosure describes techniques for using checksums to reduce the perceived I/O latency of write operations when logging log records that include pointers to the written data. In one set of embodiments, a computer system can receive a write operation for writing data to a nonvolatile storage of the system (e.g., disk-based storage). In response to receiving the write operation, the computer system can calculate a checksum value based on the content of the data to be written. For example, in one embodiment, the checksum value can be a cyclical redundancy check (CRC) value. The computer system can then simultaneously issue, to the nonvolatile storage, (1) the write operation itself and (2) I/O for writing a corresponding log record for the write operation. The log record, which is part of a log stored on the nonvolatile storage, can include a pointer to the data and the calculated checksum value. Upon completion of both (1) and (2), the computer system can return a write acknowledgement to the storage client that originated the write operation.

At a later time, the computer system can execute a log replay workflow for replaying each log record in the log. As part of this workflow, the computer system can retrieve, from the nonvolatile storage, the data pointed to by the log record's data pointer, calculate a new checksum value based on the retrieved data, and check whether the checksum value included in the log record matches the new checksum value. If the two checksum values match, the computer system can determine that the log record is consistent with the on-disk data and thus can execute its replay processing of the record. On the other hand, if the two checksum values do not match, the computer system can determine that the log record is not consistent with the on-disk data and thus can discard the log record, without performing any replay processing of the record.

With the checksum-based logging approach described above, the computer system can significantly reduce the I/O latency perceived by the storage client that originated the write operation. This is because the computer system issues the write operation and the log record write concurrently, rather than serially, to the nonvolatile storage, and thus the total write latency for completing both operations will generally be comparable to a single write I/O. At the same time, the computer system can ensure that it only processes valid log records during its log replay workflow by verifying, during that workflow, that the checksum value included in each log record matches the checksum of the actual data stored on disk (i.e., on the nonvolatile storage).

In certain embodiments, the computer system can also implement optimizations that eliminate the need to perform the checksum verification mentioned above for some log records during the log replay workflow. Accordingly, these optimizations can speed up replay processing. At a high level, these optimizations can include tracking, during the write workflow, when write operations have completed, and clearing an in-memory "check_checksum" bit flag for each write operation's log record upon said completion. The optimizations can further include updating, in a batched manner, the check_checksum bit flags of log records that have already been committed to the nonvolatile storage, if those bit flags have been cleared in memory since the log records were written. In a particular embodiment, these bit flag updates can be "piggy-backed" on I/Os that are used to write new log records.

Then, at the time of executing the log replay workflow, the computer system can check whether the check_checksum bit flag for a given log record is cleared on not, prior to retrieving the data pointed to by the record. If the check_checksum bit flag is cleared, the computer system can conclude that the corresponding write operation was successfully completed, and thus the log record is valid. As a result, the computer system can directly proceed with its replay processing of the log record, without incurring the overhead of verifying the log record's checksum value.

These and other features of the present disclosure are described in further detail in the sections that follow.

II. System Environment

Figure 1:
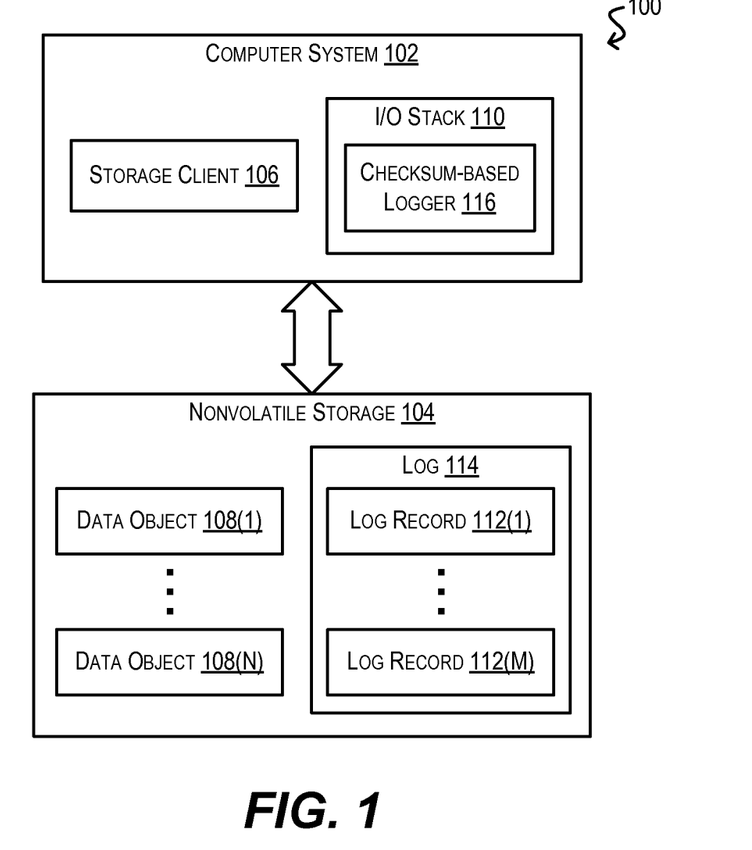
FIG. 1 depicts a system environment that supports checksum-based logging according to an embodiment.

FIG. 1 depicts a system environment 100 that supports checksum-based logging according to an embodiment. As shown, system environment 100 includes a computer system 102 that is communicatively coupled with a nonvolatile storage 104. Computer system 102 can be implemented using a physical machine or a virtual machine (VM). Nonvolatile storage 104 can be implemented using any type of persistent storage medium (or combination of persistent storage media) known in the art, such as a magnetic hard disk, a solid-state disk, nonvolatile random-access memory (NVRAM), and/or the like.

In one set of embodiments, nonvolatile storage 104 can be remote from computer system 102 and connected to system 102 via an appropriate network (e.g., a storage area network or an Ethernet network). In these embodiments, nonvolatile storage 104 may be shared by multiple computer systems. In other embodiments, nonvolatile storage 104 can be directly attached to computer system 102 (in the form of, e.g., a locally installed hard disk or flash disk).

In the example of FIG. 1, computer system 102 includes a storage client 106 that is configured to generate I/O write operations with respect to one or more data objects 108(1)-(N) stored on nonvolatile storage 104. Storage client 106 may be, e.g., a user application, a component of an operating system running on computer system 102, or the like. Computer system 102 also includes an I/O stack 110 that is configured to, among other things, (1) process the write operations originating from client 106; (2) generate and store log records 112(1)-(M) in a log 114 maintained on nonvolatile storage 104 for each write operation; and (3) replay the log records of log 114 at an appropriate time. It is assumed that each log record 112 includes a pointer to the on-disk location of a data object 108 written via its corresponding write operation.

As mentioned in the Background section, it is common for log records such as 112(1)-(M) of FIG. 1 to be written to nonvolatile storage only after the data objects pointed to by those log records have been written. This ensures that the log records are valid (i.e., correctly indicate that the referenced data objects were successfully updated on-disk). However, this also undesirably increases the I/O latency experienced by the storage clients that originate the write operations.

To address this issue, I/O stack 110 of FIG. 1 includes a novel, checksum-based logger 116. As explained in further detail below, checksum-based logger 116 can implement a number of techniques that improve performance when logging write operations, without adversely affecting log consistency. For example, during the write processing workflow performed by I/O stack 110, checksum-based logger 116 can calculate a checksum value for a given data object 108 to be written via a write operation originating from storage client 106. Checksum-based logger 116 can then simultaneously issue the client-originated write operation and a write of a corresponding log record 112 (that includes the calculated checksum value) to nonvolatile storage 104, rather than issuing these two operations serially. In this way, checksum-based logger 116 can reduce the total I/O latency experienced by storage client 106. At a later time (e.g., during the log replay workflow), checksum-based logger 116 can verify that the checksum value included in the log record matches the checksum value of the data object as stored on-disk, which ensures consistency between the log record and the on-disk data.

Further, checksum-based logger 116 can keep track, in volatile memory, of the write operations that are successfully completed during the write processing workflow (in the form of, e.g., "check_checksum" bit flags), and can efficiently update, on disk, the log records for those write operations with this information. Checksum-based logger 116 can then skip the checksum verification process during the log replay workflow if this information indicates that the write operation was successfully completed. Thus, this optimization can eliminate the cost of the checksum verification for several (and potentially most) of the log records in log 114.

It should be appreciated that system environment 100 of FIG. 1 is illustrative and not intended to limit the embodiments described herein. For example, the various entities shown in system environment 100 can be arranged according to different configurations, and can include subcomponents and/or functions that are not specifically described. One of ordinary skill in the art will recognize many variations, modifications, and alternatives.

III. Write Processing Workflow

Figure 2:
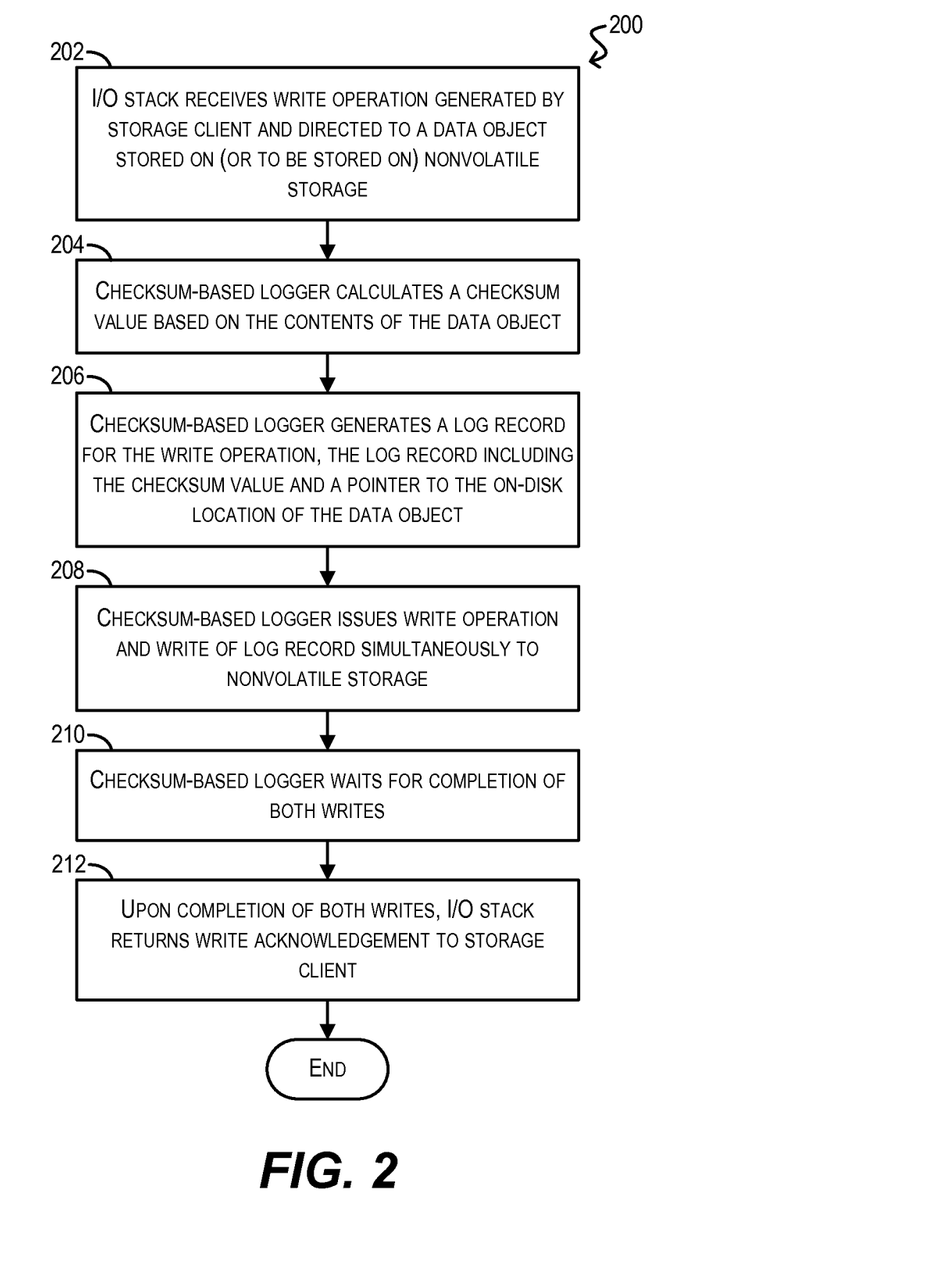
FIG. 2 depicts a write processing workflow according to an embodiment.

FIG. 2 depicts a flowchart of a write processing workflow 200 that can be performed by I/O stack 110 and checksum-based logger 116 of FIG. 1 according to an embodiment. In particular, FIG. 2 illustrates how checksum-based logger 116 can concurrently (rather than sequentially) issue a write operation and a corresponding log record write to nonvolatile storage 104, thereby reducing the latency experienced by the storage client that originated the write operation.

At block 202, I/O stack 110 can receive an I/O write operation that is generated by storage client 106 and is directed to a particular data object 108 stored on (or to be stored on) nonvolatile storage 104. For example, the write operation may correspond to the creation or an update of data object 108.

At block 204, checksum-based logger 116 can calculate, using a checksum function, a checksum value based on the contents of the data object 108 created/updated by the write operation. For example, if the write operation creates data object 108, the checksum value can be based on the new contents of the data object. Alternatively, if the write operation modifies data object 108, the checksum value can be based on the modified contents of the data object. In one embodiment, checksum-based logger 116 can apply a CRC function to calculate this checksum value. In other embodiments, other types of checksum functions/algorithms may be used.

At block 206, checksum-based logger 116 can generate a log record for the write operation, where the log record includes the checksum value calculated at block 204 and a pointer to the location of data object 108 on disk. If data object 108 is a newly created object, the pointer can point to a future location of the object.

Then, at block 208, checksum-based logger 116 can issue, at substantially the same time, the client-originated write operation and a write of the log record (i.e., "log record write") to nonvolatile storage 104. By issuing these two writes in parallel, checksum-based logger 116 can significantly reduce the total amount of time needed to complete both operations.

At block 210, I/O stack 110 can wait for the two write operations issued at block 208 to finish. Finally, once the completion of these two operations has been confirmed (by, e.g., receiving acknowledgements from nonvolatile storage 104), I/O stack 110 can return an acknowledgement of the original write operation to storage client 106 (block 212).

IV. Log Replay Workflow

Figure 3:
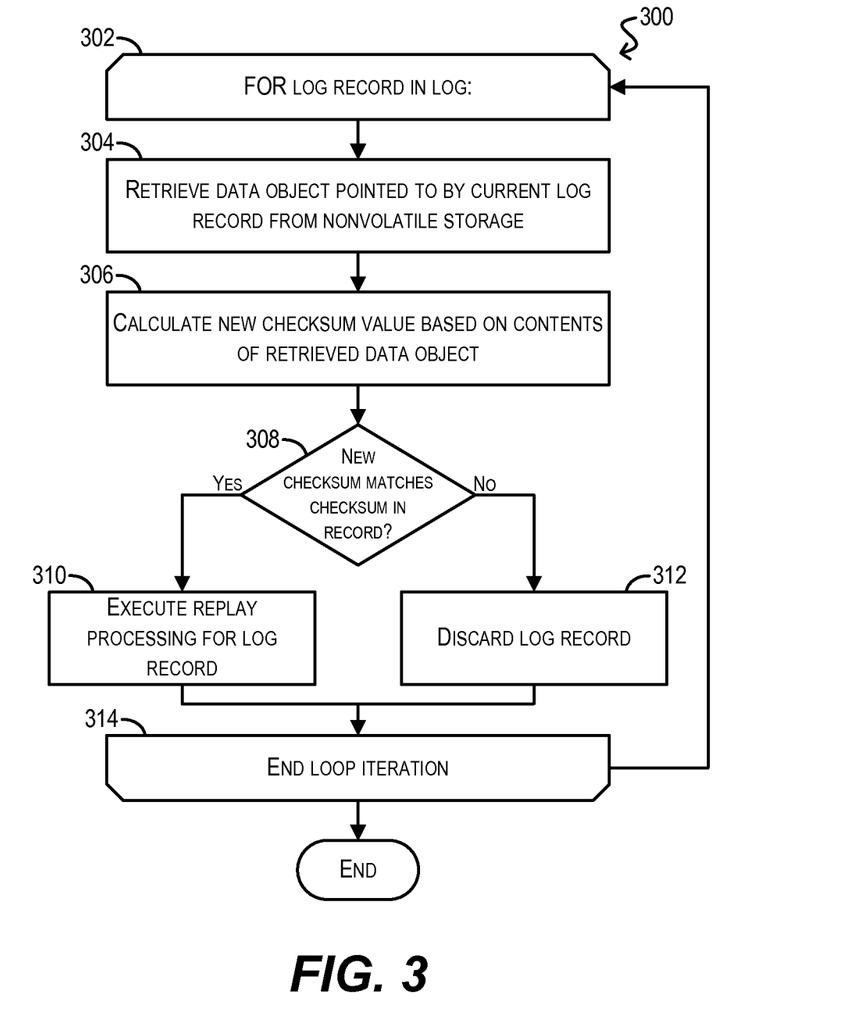
FIG. 3 depicts a log replay workflow according to an embodiment.

FIG. 3 depicts a flowchart of a log replay workflow 300 that can be performed by I/O stack 110 and checksum-based logger 116 after (or concurrently with) write processing workflow 200 of FIG. 2 according to an embodiment. With log replay workflow 300, checksum-based logger 116 can verify that each log record recorded in log 114 via workflow 200 is a valid record (i.e., reflects a write operation that was successfully committed to disk).

At block 302, I/O stack 110 can enter a loop for each log record 112 in log 114. Within the loop, checksum-based logger 116 can first retrieve the data object pointed to by the current log record (block 304). This can involve issuing an I/O read operation for the data object to nonvolatile storage 104.

At block 306, checksum-based logger 116 can calculate a "new" checksum value based on the contents of the retrieved data object. As part of this step, checksum-based logger 116 can use the same checksum function that was used at block 204 of workflow 200.

Once the new checksum value is calculated, checksum-based logger 116 can attempt to match the new checksum value with the checksum value included in the log record (block 308). In this way, checksum-based logger 116 can verify whether the data object was successfully updated on disk (as documented by the log record). If the two checksum values match, checksum-based logger 116 can conclude that the log record is consistent with the on-disk data, and thus can proceed with its replay processing of the log record (block 310). The specific replay processing performed within block 310 can vary depending on the nature and purpose of log 114.

On the other hand, if the two checksum values do not match at block 308, checksum-based logger 116 can conclude that the log record is not consistent with the on-disk data, and thus can discard the log record without performing any replay processing of the record (block 312). Logger 116 discards the log record in this scenario because, if the two checksum values do not match, the write request represented by the log entry was never committed to disk (and thus was never acknowledged to the storage client). Accordingly, the log record should not be replayed, since doing so would be inconsistent with the actual state of nonvolatile storage 104, as well as the storage client's understanding of that state. It should be noted that, in cases where the storage client does not receive a write acknowledgement for a given write request, the storage client will typically reissue the write request if desired/needed. Finally, after either block 310 or 312, the current loop iteration can terminate (block 314) and log replay workflow 300 can return to the start of loop 302 to process any further log records in log 114. Once all log records in log 114 have been processed, workflow 300 can end.

V. Improving Log Replay Performance

By checking whether the checksum value included in each log record matches the checksum value of the on-disk data object pointed to by the log record, log replay workflow 300 of FIG. 3 can ensure that only valid log records are processed for replay purposes. Generally speaking, this verification logic is needed because each client-originated write operation and its corresponding log record write are issued simultaneously, rather than serially, to nonvolatile storage 104 (per block 208 of write processing workflow 200). Thus, there may be instances where a crash occurs after the log record has been written to disk but before the write operation can be completed, resulting in an invalid log record.

One downside of the checksum-based logging approach shown in FIGS. 2 and 3 is that it involves additional steps during the log replay workflow (e.g., retrieving the data object referenced by each log record from disk, calculating a new checksum value for the data object, and comparing the new checksum value with the record checksum value) that can slow down that workflow. This performance overhead may not be significant if the log replay workflow needs to read the data object referenced by each log record as part of its normal replay processing; however, if the log replay workflow does not need to read those data objects for its normal replay processing, the checksum verification process effectively introduces an extra disk I/O per log record, which can be costly for a log comprising a large number of log records.

Figure 4:
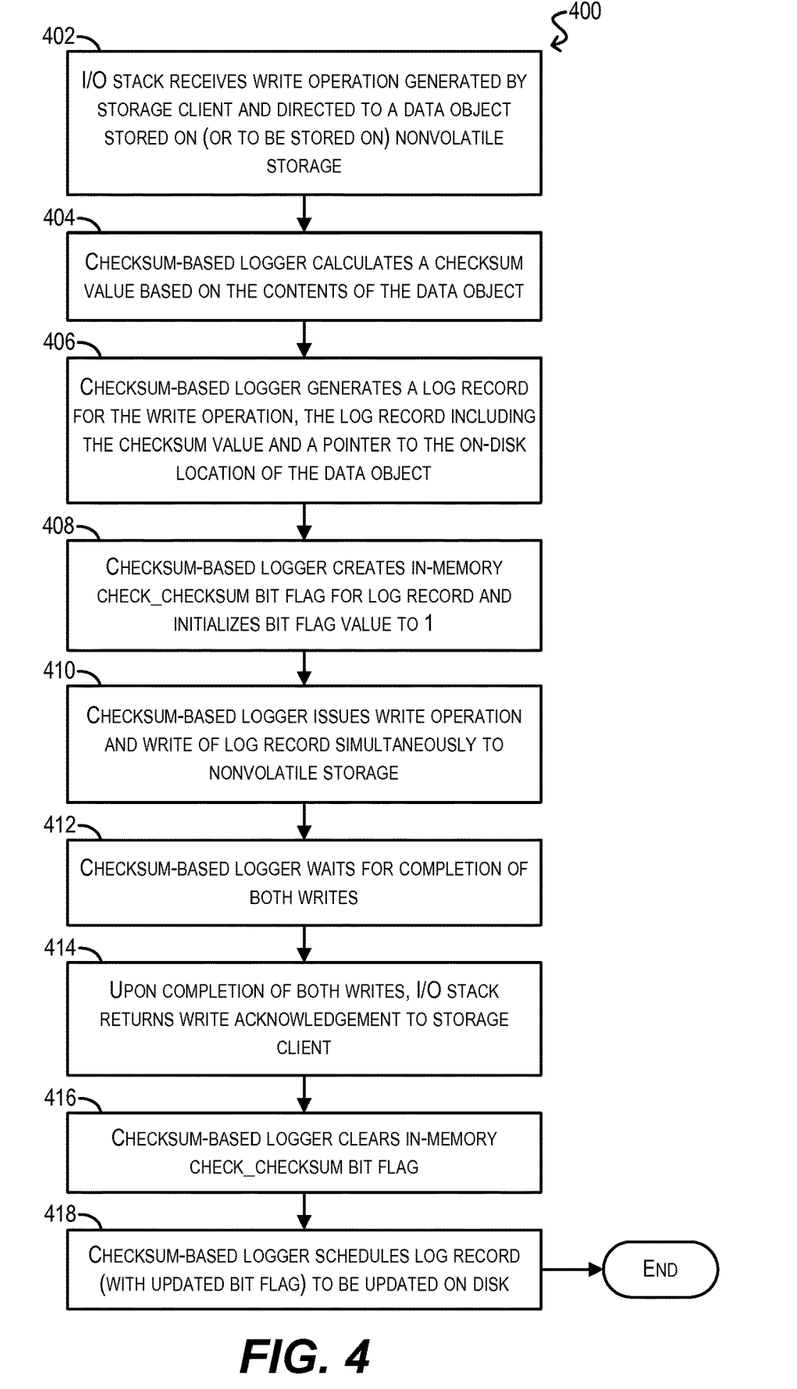
FIG. 4 depicts an alternative version of the write processing workflow of FIG. 2 according to an embodiment.
Figure 5:
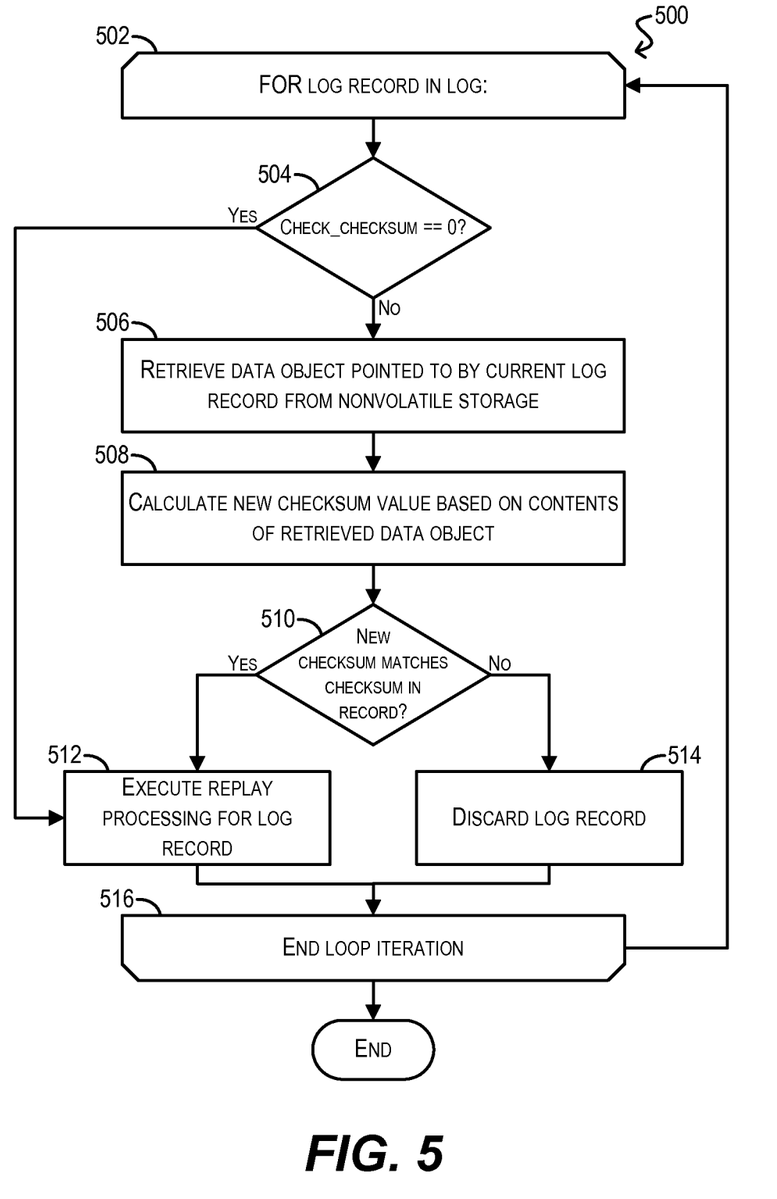
FIG. 5 depicts an alternative version of the log replay workflow of FIG. 3 according to an embodiment.

To address this performance issue, FIG. 4 depicts an optimized version of write processing workflow 200 (shown as workflow 400) that enables checksum-based logger 116 to (1) track when a write operation has been completed via an in-memory check_checksum bit flag, and (2) efficiently update the corresponding log record for the write operation on disk with this bit flag information. Further, FIG. 5 depicts an optimized version of log replay workflow 300 (shown as workflow 500) that enables checksum-based logger 116 to skip the checksum verification process for a given log record if the check_checksum bit flag included in the log record is cleared. With these optimized workflows, checksum-based logger 116 can advantageously avoid the performance overhead/cost associated with checksum verification for the specific log records in log 114 that it knows are valid.

Starting with FIG. 4, blocks 402-406 of workflow 400 are substantially similar to blocks 202-206 of workflow 200. At block 408, checksum-based logger 116 can create, in a volatile memory (e.g., RAM) of computer system 102, a check_checksum bit flag for the log record generated at block 406 and can initialize its value to 1 (or true). Checksum-based logger 116 can then proceed with simultaneously issuing the client-originated write operation and its corresponding log record write to nonvolatile storage 104 (block 410), waiting for those operations to complete (block 412), and returning a write acknowledgement back to storage client 106 (block 414). It should be noted that the log record write issued at block 410 includes, within the log record, the check_checksum bit flag created at block 408 with its initialized value of 1.

After sending out the write acknowledgement, checksum-based logger 116 knows that the client-originated write operation has been completed successfully. Thus, at block 416, checksum-based logger 116 can clear the in-memory check_checksum bit flag for this write operation (i.e., set the bit flag to 0 or false). This indicates that the checksum value included in the corresponding log record does not need to be verified during the log replay workflow.

Finally, at block 418, checksum-based logger 116 can schedule the log record corresponding to the write operation to be written to disk again, with the updated (e.g., cleared)

check_checksum bit flag. This will cause the updated value of the check_checksum bit flag to be captured within the on-disk log record so that it can be referenced during the log replay workflow.

In one embodiment, as part of block 418, checksum-based logger 116 can identify the hardware page of nonvolatile storage 104 on which the log record is currently written, and can schedule the log record to be updated when a future write I/O needs to be issued for writing a new log record to the same hardware page. For example, assume a new write operation comes in from storage client 106 that causes workflow 400 to be re-executed and a new log record to be created. In this case, at the time the new log record is written (per block 410), checksum-based logger 116 can "piggyback" the updates of one or more previously-written log records on the same I/O operation (assuming all of the log records reside on the same hardware page). Thus, checksum-based logger 116 can propagate the updated bit flag information for those previously-written log records to disk, without incurring extra I/O. In other embodiments, checksum-based logger 116 can simply issue new write I/O for the log records that need to be updated.

Turning now to optimized log replay workflow 500 of FIG. 5, at block 502, I/O stack 110 can enter a loop for each log record 112 in log 114. Within the loop, checksum-based logger 116 can first check whether the check_checksum bit flag included in the current log record is cleared (i.e., equals 0 or false) (block 504). If so, checksum-based logger 116 can skip checksum verification and directly execute replay processing for the log record (block 512).

However, if the check_checksum bit flag is not cleared, checksum-based logger 116 can proceed with its checksum verification process as described with respect to workflow 300 (i.e., blocks 504-516).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, solid state drive, network attached storage (NAS), read-only memory, random-access memory, nonvolatile memory (e.g., a flash memory card or phase change memory), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for reducing write latency when logging write operations, the method comprising:

receiving, by a computer system, a write operation originating from a storage client, the write operation being directed to a data object stored on a nonvolatile storage of the computer system;

calculating, by the computer system, a first checksum value based on contents of the data object as modified by the write operation, the calculating being performed by applying a checksum function to the contents of the data object;

generating, by the computer system, a log record for the write operation that includes the first checksum value and a pointer to a location of the data object on the nonvolatile storage;

creating, in a volatile memory of the computer system, a flag for the log record;

initializing, by the computer system in the volatile memory, the flag to a first value indicating that the first checksum value should be verified;

including, by the computer system, the initialized flag in the log record;

issuing, by the computer system, the write operation and a write of the log record concurrently to the nonvolatile storage, such that the write of the log record is issued to the nonvolatile storage before completion of the write operation; and upon completion of the write operation:

updating, in the volatile memory, the flag to a second value indicating that the first checksum value no longer needs to be verified; and scheduling a future write operation for writing the updated flag to the log record on the nonvolatile storage.

2. The method of claim 1 further comprising:

waiting for the write operation and the write of the log record to complete; and upon completion of the write operation and the write of the log record, returning a write acknowledgement to the storage client.

3. The method of claim 2 further comprising, after returning the write acknowledgement to the storage client:

retrieving, using the pointer included in the log record, the data object from the nonvolatile storage;

calculating a second checksum value based on contents of the retrieved data object;

comparing the first checksum value with the second checksum value;

if the first checksum value matches the second checksum value, executing replay processing of the log record; and if the first checksum value does not match the second checksum value, discarding the log record.

4. The method of claim 1 wherein scheduling the future write operation comprises:

identifying another log record that needs to be written to the nonvolatile storage; and if the log record resides on a same hardware page of the nonvolatile storage as the another log record, writing the log record and the another log record together to the nonvolatile storage via a single write operation.

5. The method of claim 1 further comprising:

determining whether the flag included in the log record is set to the first value or the second value;

if the flag is set to the first value:

retrieving, using the pointer included in the log record, the data object from the nonvolatile storage;

calculating a second checksum value based on contents of the retrieved data object;

comparing the first checksum value to the second checksum value;

if the first checksum value matches the second checksum value, executing replay processing of the log record; and if the first checksum value does not match the second checksum value, discarding the log record; and if the flag is set to the second value, executing the replay processing of the record, without retrieving the data object from the nonvolatile storage, calculating the second checksum value, or comparing the first checksum value to the second checksum value.

6. A non-transitory computer readable storage medium having stored thereon program code executable by a computer system, the program code embodying a method for reducing write latency when logging write operations, the method comprising:

receiving a write operation originating from a storage client, the write operation being directed to a data object stored on a nonvolatile storage of the computer system;

calculating a first checksum value based on contents of the data object as modified by the write operation, the calculating being performed by applying a checksum function to the contents of the data object;

generating a log record for the write operation that includes the first checksum value and a pointer to a location of the data object on the nonvolatile storage;

creating, in a volatile memory of the computer system, a flag for the log record;

initializing, in the volatile memory, the flag to a first value indicating that the first checksum value should be verified;

including the initialized flag in the log record;

issuing the write operation and a write of the log record concurrently to the nonvolatile storage, such that the write of the log record is issued to the nonvolatile storage before completion of the write operation; and upon completion of the write operation:

updating, in the volatile memory, the flag to a second value indicating that the first checksum value no longer needs to be verified; and scheduling a future write operation for writing the updated flag to the log record on the nonvolatile storage.

7. The non-transitory computer readable storage medium of claim 6 wherein the method further comprises:

waiting for the write operation and the write of the log record to complete; and upon completion of the write operation and the write of the log record, returning a write acknowledgement to the storage client.

8. The non-transitory computer readable storage medium of claim 7 wherein the method further comprises, after returning the write acknowledgement to the storage client:

retrieving, using the pointer included in the log record, the data object from the nonvolatile storage;

calculating a second checksum value based on contents of the retrieved data object;

comparing the first checksum value with the second checksum value;

if the first checksum value matches the second checksum value, executing replay processing of the log record; and if the first checksum value does not match the second checksum value, discarding the log record.

9. The non-transitory computer readable storage medium of claim 6 wherein scheduling the future write operation comprises:

identifying another log record that needs to be written to the nonvolatile storage; and if the log record resides on a same hardware page of the nonvolatile storage as the another log record, writing the log record and the another log record together to the nonvolatile storage via a single write operation.

10. The non-transitory computer readable storage medium of claim 6 wherein the method further comprises:

determining whether the flag included in the log record is set to the first value or the second value;

if the flag is set to the first value:

retrieving, using the pointer included in the log record, the data object from the nonvolatile storage;

calculating a second checksum value based on contents of the retrieved data object;

comparing the first checksum value to the second checksum value;

if the first checksum value matches the second checksum value, executing replay processing of the log record; and
if the first checksum value does not match the second checksum value, discarding the log record; and
if the flag is set to the second value, executing the replay processing of the record, without retrieving the data object from the nonvolatile storage, calculating the second checksum value, or comparing the first checksum value to the second checksum value.

11. A computer system comprising:
a processor;
a volatile memory;
a nonvolatile storage; and
a non-transitory computer readable medium having stored thereon program code for reducing write latency when logging write operations, the program code causing the processor to:
receive a write operation originating from a storage client, the write operation being directed to a data object stored on the nonvolatile storage;
calculate a first checksum value based on contents of the data object as modified by the write operation, the calculating being performed by applying a checksum function to the contents of the data object;
generate a log record for the write operation that includes the first checksum value and a pointer to a location of the data object on the nonvolatile storage;
create, in the volatile memory, a flag for the log record;
initialize, in the volatile memory, the flag to a first value indicating that the first checksum value should be verified;
include the initialized flag in the log record;
issue the write operation and a write of the log record concurrently to the nonvolatile storage, such that the write of the log record is issued to the nonvolatile storage before completion of the write operation, and upon completion of the write operation:
update, in the volatile memory, the flag to a second value indicating that the first checksum value no longer needs to be verified; and
schedule a future write operation for writing the updated flag to the log record on the nonvolatile storage.

12. The computer system of claim 11 wherein the program code further causes the processor to:
wait for the write operation and the write of the log record to complete; and
upon completion of the write operation and the write of the log record, return a write acknowledgement to the storage client.

13. The computer system of claim 12 wherein the program code further causes the processor to, after returning the write acknowledgement to the storage client:
retrieve, using the pointer included in the log record, the data object from the nonvolatile storage;
calculate a second checksum value based on contents of the retrieved data object;
compare the first checksum value with the second checksum value;
if the first checksum value matches the second checksum value, execute replay processing of the log record; and
if the first checksum value does not match the second checksum value, discard the log record.

14. The computer system of claim 11 wherein the program code that causes the processor to schedule the future write operation comprises program code that causes the processor to:
identify another log record that needs to be written to the nonvolatile storage; and
if the log record resides on a same hardware page of the nonvolatile storage as the another log record, write the log record and the another log record together to the nonvolatile storage via a single write operation.

15. The computer system of claim 11 wherein the program code further causes the processor to:
determine whether the flag included in the log record is set to the first value or the second value;
if the flag is set to the first value:
retrieve, using the pointer included in the log record, the data object from the nonvolatile storage;
calculate a second checksum value based on contents of the retrieved data object;
compare the first checksum value to the second checksum value;
if the first checksum value matches the second checksum value, execute replay processing of the log record; and
if the first checksum value does not match the second checksum value, discard the log record; and
if the flag is set to the second value, execute the replay processing of the record, without retrieving the data object from the nonvolatile storage, calculating the second checksum value, or comparing the first checksum value to the second checksum value.

* * * * *